United States Patent
Acher

(10) Patent No.: US 7,306,388 B2
(45) Date of Patent: Dec. 11, 2007

(54) PERIPHERAL WHICH CAN BE USED TO PRINT AND CUT SHEETS OF PAPER USING A LOW-POWER LASER SOURCE

(75) Inventor: Olivier Acher, 20 rue de la Pinsonniere, Monts (FR) 37260

(73) Assignees: Commissariat A l'Energie Atomique, Paris (FR); Olivier Acher, Monts (FR)

( * ) Notice: Subject to any disclaimer, the term of this patent is extended or adjusted under 35 U.S.C. 154(b) by 31 days.

(21) Appl. No.: 10/507,217

(22) PCT Filed: Jan. 21, 2004

(86) PCT No.: PCT/FR2004/050020

§ 371 (c)(1),
(2), (4) Date: Sep. 16, 2004

(87) PCT Pub. No.: WO2004/069542

PCT Pub. Date: Aug. 19, 2004

(65) Prior Publication Data
US 2005/0158107 A1    Jul. 21, 2005

(30) Foreign Application Priority Data
Jan. 28, 2003   (FR)    ................................. 03 00911

(51) Int. Cl.
*B41J 11/66*    (2006.01)
*B41J 2/01*    (2006.01)
*B41J 29/377*    (2006.01)

(52) U.S. Cl. ...................................... 400/621; 347/104

(58) Field of Classification Search ..................... None
See application file for complete search history.

(56) References Cited

U.S. PATENT DOCUMENTS 5,556,826 A    9/1996   Perrington et al.

(Continued)

FOREIGN PATENT DOCUMENTS

JP               07329371 A    *    12/1995

(Continued)

OTHER PUBLICATIONS

Machine translation of JP 7-329371 to Osawa from Japanese Patent Office website.*

(Continued)

*Primary Examiner*—Daniel J. Colilla
(74) *Attorney, Agent, or Firm*—Oblon, Spivak, McClelland, Maier & Neustadt, P.C.

(57) ABSTRACT

A peripheral device includes a printer printing a paper sheet, a cutter cutting the paper sheet, and a mechanism for receiving instructions. The printer includes a first print head to print text or drawings on a paper sheet by ink ejection as a function of the received instructions, a second print head to eject an absorbent ink, as a function of the received instructions, capable of in depth penetration into the paper sheet, the absorbent ink being deposited on the locations to be cut out. The cutter includes a low power laser emitting a light beam with a wavelength absorbed by locations marked with absorbent ink, the power of the laser being sufficient to cut the paper sheet at the inked locations and/or for partial ablation of the paper. A computer system includes the device and a method creates documents or paper objects using the computer system.

54 Claims, 3 Drawing Sheets

U.S. PATENT DOCUMENTS

| | | | |
|---|---|---|---|
| 5,557,311 | A | 9/1996 | Perrington et al. |
| 5,760,369 | A | 6/1998 | Wenkman |
| 6,004,421 | A * | 12/1999 | Landa ............... 156/258 |
| 6,117,061 | A | 9/2000 | Popat et al. |
| 6,715,749 | B2 | 4/2004 | Trovinger |
| 6,926,400 | B2 | 8/2005 | Kelley |
| 6,945,645 | B2 * | 9/2005 | Baron ............... 347/104 |
| 2002/0113986 | A1 * | 8/2002 | MacDonald ........... 358/1.12 |
| 2004/0085422 | A1 | 5/2004 | Kelley |
| 2005/0001872 | A1 | 1/2005 | Ahne |
| 2005/0001891 | A1 | 1/2005 | Ahne et al. |
| 2005/0178254 | A1 | 8/2005 | Ahne |
| 2005/0258594 | A1 * | 11/2005 | Steenstra et al. ........ 273/241 |

FOREIGN PATENT DOCUMENTS

WO    WO 02/092354    11/2002

OTHER PUBLICATIONS

Stewart, R. et al. "Multipass laser ablation of three coloured ink from a paper substrate", Journal of Materials Processing Technology, vol. 114, No. 2, pp. 161-167, XP001172418, 2001.

Kautek, Wolfgang et al. "Laser interaction with coated collagen and cellulose fibre composites: fundamentals of laser cleaning of ancient parchment manuscripts and paper", Applied Surface Science, vol. 127-129, pp. 746-754, XP001172417, 1998.

Chryssolouris, G. "Laser Machining Theory and Practice", Springer-Verlag, p. 261, XP002285364.

* cited by examiner

PERIPHERAL WHICH CAN BE USED TO PRINT AND CUT SHEETS OF PAPER USING A LOW-POWER LASER SOURCE

TECHNICAL DOMAIN

The present invention relates to a device for printing paper sheets and cutting them using a low cost laser source.

STATE OF PRIOR ART

Computers are powerful tools for the design of physical objects, but they require the use of a peripheral to advance from the design stage to the manufacturing stage of the said physical objects.

There are many devices for producing the said objects defined from a computer, for example such as numerical controlled tools, fast prototyping machines and stereolithography machines. However, these peripherals use technologies for which costs have not dropped to values at which they could be used to make peripherals for the general public. They also use expensive materials.

Printing peripherals or printers have a very low cost and use paper, which is a very widespread low cost raw material, and at the moment are the only peripherals that are widely distributed in the shops. However, the geometric characteristics of objects made using these printing peripherals are entirely fixed by the geometry of the initial support; standard paper size, label support, pre-cut cards, etc. It is sometimes possible to transform two-dimensional objects made of paper or light cardboard into objects with a more complex geometry or three-dimensional objects using supports with marked folds. But this requires expensive special supports, and a specially cut, pre-glued paper with marking of the folds for each final geometry of the object.

Moreover, there are many paper cutting techniques.

Firstly, there is the cutting technique using blades, but this technique is only suitable for making straight cuts.

The use of die cutting is only suitable for making predefined objects corresponding to the cut shape of the die cutter.

Cutting paper using a laser is well known as an industrial process. In particular, the use of a laser for cutting paper for the purposes of creating a document (see document [1]) and for creating three-dimensional objects (document [2]) has been reported in the bibliography at the end of the description. In all these cases, laser cutting will be done on large production series in professional installations, and usually on stacks of sheets. Furthermore, the lasers used have a power of several tens of watts and are expensive. $CO_2$ lasers usually used emit at a wavelength of 10.6 μm, they are quite large, quite expensive, and require a high voltage power supply that significantly increases the cost. Furthermore, these lasers require some maintenance and create safety constraints. For all these reasons, lasers are not suitable for use as a widely distributed personal peripheral for cutting purposes.

In order to be able to use the lasers as paper cutting means in a printing peripheral intended for the general public, it would be necessary to use a low cost laser with few safety constraints.

Semiconductor laser diodes are attractive "solid state" lasers in terms of cost, and usually there is no need for fluid cooling systems. Knowing that as the power of laser diodes is increased, constraints in terms of the cooling system and the cost of the device also increase, laser diodes are chosen for which the continuous power is of the order of 1 to 2 watts. The active area of these laser diodes from which radiation originates is of the order of 100 μm×1 μm.

However, despite their attraction, the use of laser diodes with a power of a few watts for cutting paper introduces several types of difficulties.

The first problem to be overcome is that the power of these diodes is less than the conventional powers used for cutting paper. It would be possible to correct this by using a high power density due to a thorough focusing; the radiation output by the laser diode could be collected by an optical fibre and well focused using appropriate lenses or mirrors. But considering the significant divergence of these diodes (of the order of 30°), the focus of the energy will be limited not only by characteristics of the optical system, but also by the required field depth.

Furthermore, when a laser adapted to cutting of paper is chosen, it is essential to take account of the wavelength of the said laser. It is known that the cutting efficiency is directly related to absorption of the laser wavelength by the material to be cut. In this case, since it is required to work with a low power laser diode (1 to 2 watts), it is essential to work with a diode emitting in the near infrared. Standard office automation paper is only very slightly absorbent in the near infrared. This is due to the fact that it is white (in other words non-absorbent) over the entire visible spectrum, and this characteristic due to the whiteness of the paper only changes very progressively with the wavelength. Measurements made on a standard office automation paper with a mass of 80 g/m$^2$ show that within the 800 nm to 1000 nm range, 0.75% of light is reflected and only 23% of light is transmitted. Therefore, less than 5% of the light intensity is absorbed. This situation is very different from the situation encountered when $CO_2$ lasers are used, in which case almost all emitted light is absorbed. Therefore, this reduces the power actually available for cutting standard office automation paper by a factor of at least 20, when a laser emitting in the near infrared is used instead of a $CO_2$ laser. Another aspect that is unfavourable to the use of low power laser diodes for cutting paper is due to the fact that the least expensive low power diodes emit at wavelengths of between 600 nm and 1300 nm, range in which paper is only very slightly absorbent.

Densities conventionally used for cutting paper are of the order of 500 kW/cm$^2$, as mentioned particularly in document [3]. In this document, the $CO_2$ laser is used in pulsed mode, in order to work with a limited medium power and an excellent cut quality associated with a high peak power. The associated cutting rates are of the order of 150 m/min for a 250 watt laser (see document [4]). In the case of a laser diode with a power equal to 1 watt focused on an area of 100 μm×50 μm, which as we have seen is about the best that could have been expected, the incident power density is 20 kW/cm$^2$ which is at least one order of magnitude less than what is done normally. Since less than 5% of the power density is absorbed, the useful power density is of the order of 1 kW/cm$^2$, which is 500 times less than the power density normally used.

Finally, even when working with power densities much less than values normally used, there is always a risk of burning the paper if the cutting speed is reduced significantly. A given area of the paper will get hotter if it remains illuminated by the laser spot for a longer time. However, some of the carried heat will be diffused over a characteristic distance (which is the square root of the product of the thermal diffusivity and the residence time necessary to cause combustion of the illuminated area). If this characteristic length exceeds about ten μm, a scorched area will appear on the edges of the cut, which will affect the aesthetics of this cut. If this area is wider, there would be a risk that the paper will ignite and burn, even outside the illuminated area.

It is known that cuts can be made with low powers by working with pulsed lasers, with very short and very high energy pulses. The result is high instantaneous power densities. YAG lasers are widely used for cutting or ablation in pulsed conditions, but once again, low cost laser diodes do not have a very high performance for making short and very intense pulses.

The use of pulsed lasers on paper covered with ink or stains has already been studied (see documents [5] and [6]). But in both of these cases, the objective is to clean and eliminate ink or dirt absorbent at the laser wavelength, without damaging the paper. In this case, the use of lasers with high peak powers, in other words more than about ten kW, can eliminate ink absorbent at the wavelength of the laser without damaging the paper.

Similarly, the use of pre-cut structures or structures with easy folding lines that can be printed using personal printers, has been described in document [7]. However, in this case pre-cutting operations and operations to mark paper folds are done before the final customer uses a computer and a printer that are used only to perform decoration and marking functions to facilitate the use of pre-cut and pre-glued paper. Software is known that can be used to create printed three-dimensional structures, and particularly for packaging. However, this software is intended to be interfaced with industrial mass production means of this packaging, and not for individual production (ORIGAMI-software).

Finally, there are printers capable of cutting paper, for example such as printers issuing transport tickets that can cut the created (previously printed) tickets from a roll of blank continuous paper. However, technical solutions used for this purpose (passage of a blade) cannot be extrapolated to the production of complex shaped cuts.

PRESENTATION OF THE INVENTION

Up to now, it has been impossible to print and cut standard paper sheets with a low cost device that requires little maintenance and is also reliable in terms of safety. This invention solves problems according to prior art by means of a peripheral device comprising means for printing a paper sheet, means for cutting the said paper sheet and means for receiving instructions, characterised in that the print means comprise a first print head by ink ejection, supplied by a conventional ink cartridge to print text or drawings on a sheet of paper as a function of the received instructions, a second print head by ink ejection supplied by an absorbent ink cartridge capable of in depth penetration into the paper sheet to eject ink onto the locations to be cut out as a function of the received instructions, and the cutting means comprise a low power laser emitting a light beam with a wavelength absorbed by locations marked with absorbent ink as a function of instructions received, the power of the laser beam being sufficient to cut the paper sheet at the inked locations and/or for partial ablation of the paper.

In other words, in addition to the capability of printing in black and white and/or in colour, the print device according to the invention is also capable of printing partial or total cut patterns with ink that is absorbent at the laser operating wavelength. After printing the cut patterns using absorbent ink on the paper sheet, the laser then scans these paper areas previously made absorbent in order to cut the paper. By making the paper absorbent at specific locations on the cut plot and at the useful wavelength of the laser used, it is thus possible to cut standard office automation paper using low power lasers, and particularly low cost lasers.

Note that printouts are made with an ink jet or any other technology based on ejection of ink from a print head.

The device according to the invention comprises two sorts of ink: ink or inks for printing paper and the ink necessary for cutting the paper. The paper cutting ink has particular characteristics.

Firstly, this ink must be absorbent at the laser emission wavelength. It may comprise mineral or organic pigments for this purpose. Mineral pigments may consist of very fine particles with a diameter of less than 100 nm. These pigments absorb at the specified wavelength.

Furthermore, and unlike conventional inks used in printers, this ink is also formulated to significantly penetrate into the depth of the paper, or even pass through the said paper. This can be done using an ink comprising a solvent that penetrates well into the paper, for example such as inks for permanent markers. Advantageously, this solvent will be organic and can be easily vaporised. This solvent will transport pigments during the inking operation and transport them into the paper thickness.

In summary, the absorbent ink according to the invention comprises mineral or organic pigments and a solvent.

Advantageously, the ink will be designed such that locations inked with absorbent ink absorb at least 50% of the laser beam at its operating wavelength. Preferably, these ink locations will absorb 80% or more of the laser beam.

Similarly, the absorbent ink must maintain its good absorption properties at the laser wavelength up to a temperature equal to at least 200° C. and preferably up to 250° C. It has been observed that starting, from 270° C., the paper becomes brown and absorbent in the infrared (absorption of 80% at 800 nm and 35% at 1000 nm). Therefore, it is not essential that the absorbent ink should maintain its absorption properties above 270° C. On the other hand, a short heat treatment at 250° C. reveals that the infrared properties of standard office automation paper vary little at this temperature. Therefore, the absorbent ink must perform its absorption function up to a temperature close to 250° C.

It could be decided to amplify combustion of absorbent ink by increasing its exothermal nature, in other words by adding a component with a high exothermal power and which will ignite at a determined temperature, into the ink. According to one particular embodiment of the invention, the absorbent ink will therefore comprise a constituent that will produce exothermal combustion when it reaches a critical temperature, which will be between 150° C. and 400° C.

Furthermore, the cut paper or the final three-dimensional object must have excellent aesthetics, and it is important that the absorbent ink used to cut it out does not affect the aesthetics of the final appearance of the object made of paper. However, the fact that the ink is absorbed by the paper may cause minor runs of ink outside the cut lines, depending on the quality of the paper. One solution for maintaining the final aesthetic quality of the cut paper is to use an ink that is absorbent in the near infrared, and also transparent or white in the visible light.

According to a first embodiment, the absorbent ink will therefore be colourless in the visible range.

According to a second embodiment, the absorbent ink will be white in the visible range.

FIG. 3 illustrates the absorption 14 of a standard office automation paper as a function of the wavelength, the absorption 15 of a paper after inking with an ink absorbent at the wavelength of the laser and having no or few losses in the visible range, and absorption 16 of a paper after inking with an ink absorbent at the wavelength of the laser, this ink affecting the visible aspect of the inked paper.

The second print head (containing absorbent ink) will eject ink so as to print patterns in the form of lines, dashes or dots not more than 500 µm wide. In particular, these patterns printed using absorbent ink will be mainly lines (continuous, dashed or dotted) with a width of between 10 µm and 500 µm. These dimensions are accessible with resolutions typical of ink jet printers, ink bubble jet printers, etc. Note that a resolution of 600 dpi corresponds to dots with a diameter of 40 µm.

Preferably, the width of the lines will be between 50 µm and 200 µm.

The importance of having a good definition of the lines made with this ink will be noted, to prevent combustion of this ink from extending over the entire paper and thus preventing fire risks.

The second ink ejection print head containing absorbent ink will preferably eject a quantity of ink equal to between 0.5 and 5 nl per mm of cut line, to obtain this good definition on lines while maintaining a sufficient quantity of absorbent ink projected on the paper.

Advantageously, it will be decided to deposit absorbent ink on the face of the paper opposite the face on which the cut will be made.

But if the device has a paper turning system, it could be decided to ink both sides of the paper sheet.

The laser present in the device according to the invention has particular focusing and scanning characteristics.

Firstly, the laser emits a laser beam with a wavelength of between 650 and 1600 nm. Preferably, the laser emission wavelength is within the 800 nm to 1100 nm range.

Advantageously, the average light power of the laser is between 0.5 and 10 watts, but will preferably be between 1 and 4 watts.

The laser will operate continuously or in pulsed mode, to be selected, but if it operates in pulsed mode, in all cases its peak powers will not exceed 100 times the average power. Preferably, peak powers will not exceed 10 times this power.

According to one particular embodiment of the invention, the laser will comprise one or several semi-conducting laser diodes.

Advantageously, the laser may include a laser beam focusing device, such that the focusing device outputs a light spot with dimensions between 10 µm and 400 µm, on a field depth equal to at least 80 µm.

Preferably, the focusing light spot will have a surface area of between $2 \times 10^{-3}$ and $4 \times 10^{-2}$ mm$^2$. Note that this is within typical power density ranges significantly lower than what is recommended by the state of the art: 4 W on $2 \times 10^{-3}$ mm$^2$ corresponds to a power density of 200 kW/cm$^2$ and 1 W on $4 \times 10^{-2}$ mm$^2$ corresponds to a power density of 2.5 kW/cm$^2$.

For example, the displacement speed of the laser beam will preferably be between 30 cm/min and 10 m/min if a 10 watt laser diode is used, and between 30 cm/min and less than 2 m/min for the preferred case in which a 2 watt laser diode is used.

Those skilled in the art will be familiar with means for obtaining relative displacements between a laser and an object to be cut. They will also be familiar with means for gripping and scrolling the paper in a print or reproduction peripheral. Preferably, paper sheet printing means and cutting means will be located on the same lateral displacement carriage; the print and laser cutting functions will be located on the same paper feed device, to give good correspondence between the positions of the ink lines and the laser cut, particularly if the laser emission area is carried by the same transverse displacement carriage as the print heads.

However, unlike the print heads that are capable of instantaneously printing an area with a certain length due to their multiple nozzles and which will therefore generate paper feed jerks several mm long, the laser usually requires uniform movements of the paper feed device at a speed that depends on the pattern to be plotted. For example, when cutting a longitudinal line, it is desirable that the paper feed mechanism should feed the paper at a uniform speed that depends on the cutting speed. On the other hand, only the laser lateral displacement carriage moves when a lateral line is being made, and the paper does not advance.

Thus, although it is of prime importance that the absorbent inking and the laser cut are made coherently, constraints in terms of paper feed and carriage speed are different.

In a first embodiment of the invention, only a single paper feed device is installed; the sheet of paper is firstly inked during a first scrolling that does not release the sheet, and it is then put back into its initial position such that the laser cut can take place.

In a second embodiment, the peripheral device according to the invention includes two paper sheet feed areas, one of the feed areas being reserved for inking and the other for cutting. However, these two feed areas are capable of using the same marks on the paper (particularly due to alignment operations). Therefore, according to this second embodiment, the cutting means will be on the downstream side of the print means on the paper path.

The advantage of this type of system is essentially the print and cutting speed.

According to a third embodiment, the paper handling device enables the paper to pass both on the front and back. In this case, if it is desired to make partial cuts to mark a fold, the cuts will be made on the face opposite the aimed fold.

Obviously, in all cases, it will also be possible to leave the laser fixed and to couple it to an optical fibre, the cutting head then being composed of the end of the optical fibre through which the laser radiation exits, and its focusing system. In this case, the cutting head will be displaced.

Moreover, it is desirable to take special precautions to prevent the paper sheet from igniting when it is being cut. This is particularly true since in non-professional use, the support inserted in the device according to the invention may be firstly an appropriate sheet of paper, but also a poor quality and more or less inflammable paper support, possibly wetted by alcohol or any other inflammable product.

In order to prevent the risks of the paper catching fire, even with highly inflammable supports, it might be preferred to have at least one face of the paper sheet close to the area illuminated by the laser in contact with a material with a thermal diffusivity equal to at least $1.5 \times 10^{-6}$ m$^2$/s, which is 10 times more than the thermal diffusivity of the paper, and preferably more than $1 \times 10^{-5}$ m$^2$/s. The material with a high diffusivity then acts as a heat sink, and thus prevents combustion from being maintained. The material could be composed of a material conducting heat well (for example copper). This heat sink could be made by placing the paper on a feed roller with these thermal characteristics. Similarly, the material in contact with the sheet of paper close to the area illuminated by the laser may be in the form of a laser cutting head which would comprise:

a contact area in contact with the sheet and having a surface of at least 0.5 cm$^2$;

a perforated part in this contact area enabling passage of the laser beam, and with a section equal to or greater than 1 mm² at the location at which it comes into contact with the paper a pure air inlet and a combustion fumes evacuation duct to evacuate fumes and paper debris generated normally by the cutting operation.

One possible means of making a cutting head comprising a contact area peripheral to the cut area is shown in FIG. 6. In this example embodiment, the cutting head comprises a part made of a material with a high thermal conductivity 17, the said part being perforated so that the focusing optics 18 of the laser beam 19 can fit into it, and perforated by holes forming the air inlet 20 necessary for combustion of the paper and the exhaust 21 for gases and combustion particles. Note that elements 20 and 21 in FIG. 6 are in the form of tubes.

As has been seen above, absorbent inking and laser cutting may be done coherently. To achieve this, the laser beam must be aligned with the absorbent cartridge, and print functions must be aligned with cutting functions. The need for good correspondence between the lines (or holes or partial cuts) marked with absorbent ink and scanning by the laser beam, even though the operator may need to change the marking ink cartridges, may require a procedure for aligning the ink cartridges with the laser. This type of procedure is classical in jet printers, particularly after each cartridge change in which it is necessary to determine possible offsets between effective positions of the cartridges and their nominal position. In general, these residual offsets are less than 500 µm.

Conventionally, alignment is done based on the vernier principle. Two print heads to be aligned print pairs of lines located continuously with each other and with small offsets. The observer then informs the printer or the computer controlling the printer, about the clearance of well aligned lines so that residual offsets can be determined and corrected (for example by software). In our invention, the objective is to make an absorbent ink cartridge and a laser spot coherent. Since ink absorbent in the infrared is preferably not visible or only very slightly visible in the visible range, it is quite clear that a new process should be found to align the laser beam with the absorbent cartridge.

The procedure for aligning the laser beam with a conventional ink cartridge could for example be done as follows. Firstly a first series of parallel marks is made on a sheet using an ink cartridge of the first print head (black ink or coloured ink). These marks are separated by a determined space or pitch (called the first determined pitch). A second series of parallel marks is then made facing the first series of marks, using the ink cartridge of the second print head (absorbent ink). The inking width of these marks is sufficient to compensate for any possible misalignment between the absorbent ink cartridge and the laser, and they are spaced by a determined pitch different from the first pitch separating the marks made with black ink or colour ink. The laser cuts (partial or total) are then made on the series of marks inked with absorbent ink, using the laser. The operator observes the cuts and informs the printer or the computer controlling the printer which marks coincide with the cuts (printed with conventional ink, in other words black or colour ink), and thus determines good alignment conditions.

It is also desirable to make the alignment between the absorbent ink cartridge and the laser beam. Initially, an area with parallel marks could be made on a paper sheet using an absorbent ink cartridge of the second print head, the width of each mark not exceeding the width of the laser spot and each mark being separated by a first determined pitch or space. The laser beam can then be used to make lines of spots in the previously made area of marks, the lines of spots being parallel to the previous marks and being separated by a determined pitch different from the first pitch separating the marks. Finally, by observing the marks, the printer or the controlling computer can be notified which marks have been cut.

It will be advantageous to make the marks in the form of patterns delimiting flaps (see FIG. 7), such that it is possible to check whether or not the cut is complete simply by pressing on the flap with one finger, so as to observe whether or not it opens. The marking of the different test flaps, necessary so that the user can inform the system which flap actually corrects residual clearances, is made using the conventional print function. Thus, observation of cuts will make it possible to inform the printer or the controlling computer which printed marks coincide with the cuts. For example, in FIG. 7, there is a printed pattern on a paper support 3 inked with absorbent ink and comprising indications 24 printed with "conventional" ink (black ink or colour ink, in other words conventional printing ink). This pattern will be used for the procedure for aligning the laser with the absorbent ink inking head. It comprises a plurality of fine strips 22 inked with absorbent ink that will enable paper cuts only if the inked line and the laser coincide with the required alignment precision, and wide inked strips 23 orthogonal to the previous strips which enable complete cutting of the paper, even taking account of the alignment uncertainty.

Finally, a third adjustment could be made which would consist of determining the appropriate speed to enable a complete cut. Imperfect knowledge of laser power, laser power drifts, the more or less thick nature of the paper and its more or less good aptitude for absorbing absorbent ink, etc., all these parameters can cause variations of laser scanning speeds necessary for a complete cut. To make this adjustment, marks can be made (preferably in the form of flaps) on a paper sheet using an ink cartridge of the second print head (absorbent ink) and passing the laser spot on them at different speeds. Marking and observation by the operator of conditions under which a complete cut can be obtained will enable the operator to select the corresponding mark on the peripheral or on the computer that controls it. This selection is facilitated by the fact the references of the different marks can be written on the paper in plain text, using the print function.

It is also interesting to have a computer system including firstly a computer and software, and secondly a peripheral device according to the invention. The computer and the software will be used to define patterns to be cut out coherent with the patterns to be printed that are to be made on a paper sheet, and they will provide instructions to the peripheral device so that this peripheral device can make these printouts and cuts.

In the invention, the sheet will preferably be scrolled along one direction and the laser beam will scan in a perpendicular direction, as is often done by printers.

To facilitate handling of the paper by the peripheral according to the invention and to prevent cut pieces from disturbing operation of the feed mechanism, it may be useful if the computer and the software also supply instructions to the peripheral device so that it can make interruptions (or tabs) in the paper cuts depending on the target cutting pattern. The computer and the software determine areas in which the laser in the device will simply weaken the paper rather than cutting it entirely, leaving the operator free to detach waste parts from useful areas later. This will enable the paper sheet to exit in a single piece from the device and to prevent jams. The computer and the software can place tabs judiciously as a function of the mechanical characteristics of the paper and ergonomy.

Advantageously, the computer system can facilitate the task of the user by helping him to mark parts to be detached and discarded, by making the peripheral device make recognisable patterns or instructions on the said parts or concealed parts of the final object enabling the user to easily identify what should be detached and perhaps discarded. In other words, the computer system makes a distinction between cut paper areas to be eliminated using appropriate marking made with the first print head.

According to the invention, documents or paper objects are also created using the computer system as defined above.

Similarly, if a number of embodiments made possible by the invention are paper elements that do not require gluing, another possibility with the invention would be for example to make paper objects assembled by gluing. In order to obtain a good quality result and for practical reasons, it would be useful to be able to glue the various paper objects using the same device as was used for printing and cutting. Thus, a glued structure is made according to the following steps. The first step is to make a document from a sheet of paper using the computer system according to the invention, the said document comprising at least one part on which glue is to be applied marked by a gluing pattern. A multi-layer comprising, in order, a silicone coated support 25, an adhesive film 26 and a printable surface film 27, is then fed into the peripheral device. The elements making up this multi-layer have special features the adhesive film bonds to the film better than to the silicone coated support, and bonds to the document made in the first step (in other words the document on which glue is to be applied) better than to the surface film.

The bond between the adhesive film and the silicone coated support must not be as strong as it is on the surface film, such that the operator can easily separate the assembly composed of the adhesive film and the printable surface film.

the film and the adhesive film are absorbent at the operating wavelength of the laser.

The absorbent characteristics of the adhesive film and the surface film are sufficiently good to obtain an efficient cut with the laser.

The silicone coated support will be chosen such that its thermal and absorption characteristics enable it to be unaffected or only slightly affected by the laser, also taking account of scrolling speeds of the said laser. The next step is to make a gluing pattern 29 on the multi-layer (written indications or graphic marks) corresponding to the gluing pattern made on the document, by printing the surface film using the first print head of the peripheral device. This print with a pattern and/or marking elements will facilitate positioning of the cut adhesive film and surface film assembly on the location of the document on which glue is to be applied. A cut 28 is then made on the multi-layer using the laser, in order to delimit an area surrounding the gluing pattern in the two upper layers of the multi-layer (surface film and adhesive film), with dimensions corresponding to the part of the document on which glue is to be applied. The said area is separated from the silicone coated support, the adhesive film side of the area is positioned on the document making the gluing patterns of the document and the surface film correspond, and the surface film is removed from the said area. Note that since the bond of the adhesive film on the document (standard office automation paper) is better than its bond on the surface film, once the cut element composed of the adhesive film and the surface film has been pressed onto the appropriate area of the document, it will be possible to remove the surface film without the adhesive film being detached from the paper document. Once the surface film has been removed, the operator can stick a part of the document on which the adhesive film is located, or another document. It is possible to decide to stick another area of the same document or another paper element provided, or the paper document made adhesive can be transferred onto a support.

The chosen adhesive film will be an adhesive film bonding by pressure. The adhesive film may have two identical faces, or it may have one face that bonds well onto the paper and another face (supporting the printable film) based on a repositionable glue.

In summary, the device according to the invention eliminates the main obstacles consisting of:

the need to achieve a good quality cut with laser sources producing limited power densities and emitting at wavelengths at which the paper is only very slightly absorbent, elimination of fire risks, considering that the laser burns the paper, the use of paper handling mechanisms in which cut waste does not cause jams.

Since all steps necessary to produce a possibly three-dimensional and printed structure using low cost office automation equipment can be performed, it opens up many possibilities such as retrieval of amusing three-dimensional objects on the Internet, for games or decorative purposes, and also for advertising purposes. It would also be possible to envisage production of documents containing windows, tabs, previously perforated holes, folding, all of which are applications reserved for professional brochures at the moment. In particular, the device according to the invention could make objects such as:

reports containing several pages comprising tabs that can directly access chapters appearing on the tab, or windows for example intended to show only the title of the report when the report is closed, the first page concealing all information on the second page except for the title area, small memos containing expressive shapes (heart) or amusing shapes and facilitating their use (such as marking folds in a letter to be folded), printing of documents with detachable parts (invoices, games, etc.), small games or advertising objects (paper aircraft, effigies of persons or animals, etc.), obtained by a cut and fold combination and possibly by gluing.

BRIEF DESCRIPTION OF THE FIGURES

The invention will be better understood and other advantages and special features will appear after reading the following description given as a non-limitative example, accompanied by the attached drawings among which

DETAILED PRESENTATION OF PARTICULAR EMBODIMENTS

Figure 1:
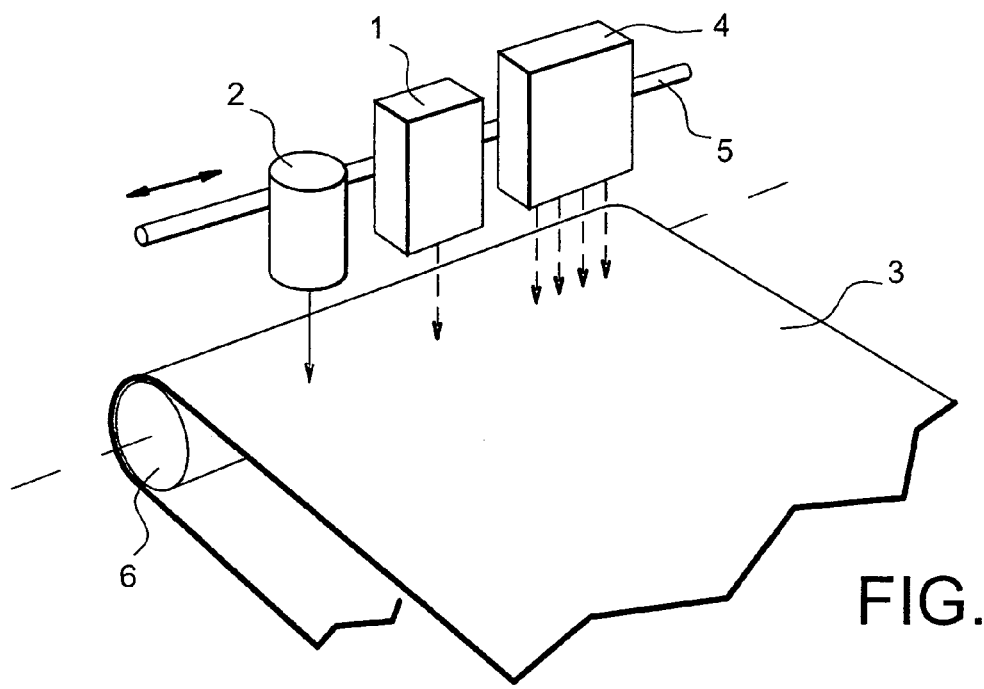
FIG. 1 is a diagram of an inking and cutting device according to the invention.

The peripheral device according to a particular version of the invention is illustrated in FIG. 1. It comprises a gripping and scrolling means 6 in the form of rollers, for a paper sheet 3. A carriage holder 5 that moves parallel to the axis of the rollers comprises a black ink cartridge 4 and a colour ink cartridge 4 to print the paper 3 by ink ejection. All this is present with different variants in printers sold on the market. The device according to the invention also comprises a cartridge 1 containing an absorbent ink reservoir in the near infrared. For example, this ink could be the ink present in black or blue permanent marker felts made by Reynolds.

The absorbent ink cartridge has the capacity of projecting ink in straight or rounded, continuous or broken lines, as little as 80 µm wide.

The quantity of projected ink is significantly greater than with conventional cartridges and is between 0.5 and 5 nanolitres per mm length for an 80 µm wide line.

The ink quantity and the nature of its solvent and its pigments are such that it is quickly absorbed by ordinary paper sheets (standard office automation paper 80 g/m$^2$) so that it passes through the paper (or almost).

The laser source 2 is a laser diode emitting at 850 nm and capable of emitting 2 watts continuously. It is mounted on the same lateral displacement carriage 5 as the print heads 1 and 4, and its radiation is focused by an appropriate-optics. This optics focuses the laser radiation on the paper with a spot size equal to approximately 100 µm and a field depth of 100 µm corresponding to the paper thickness.

The peripheral according to the invention is controlled by a computer and appropriate software to define the movements, and operation of print nozzles and the laser. More precisely, this software defines printouts to be made, and the cutting scheme and the folding areas. Due to the combination of the scrolling means 6 of the paper and the translation 2 of the laser, the laser passes on lines inked with absorbent ink at a speed of 70 cm/min for lines to be cut out completely and a speed of 2.5 m/min when the fold simply needs to be marked. Paper printing, including with absorbent ink, is made during the first pass, and the paper handling system then puts the paper back to the beginning of the page and a second paper pass is performed dedicated to cutting using the laser 2.

Figure 2A:
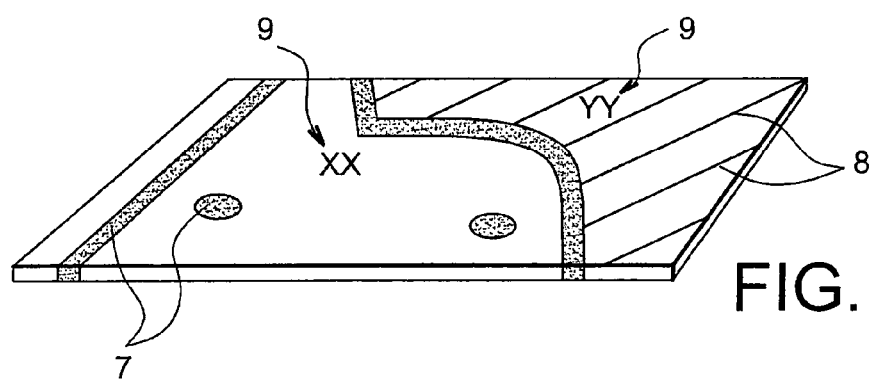
FIGS. 2A and 2B show an inked and cut sheet of paper according to the invention.
Figure 2B:
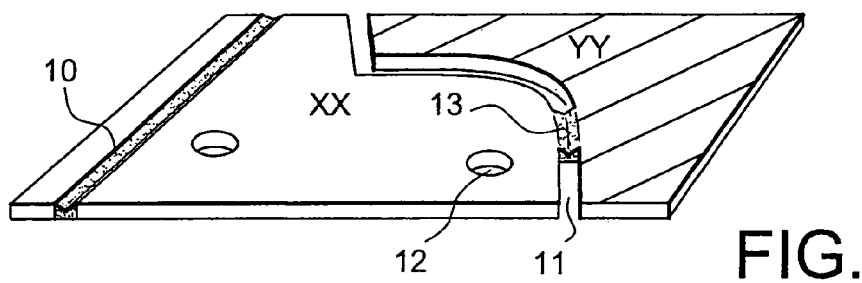
Figure 3:
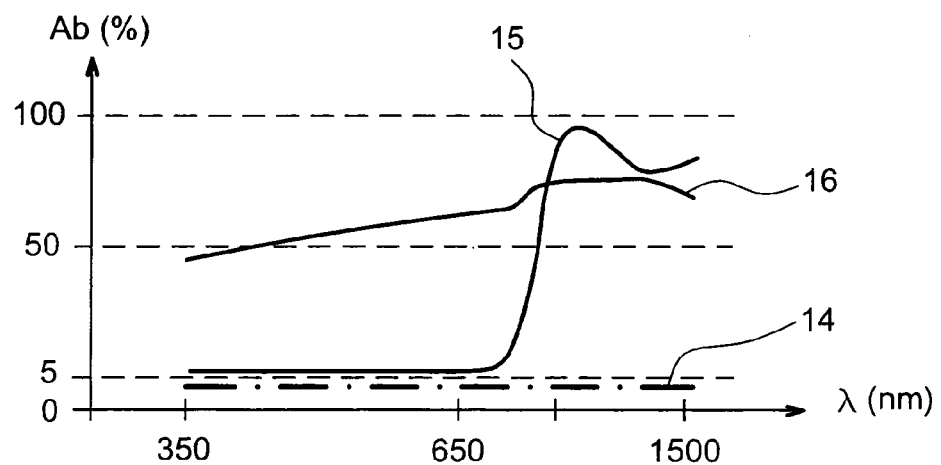
FIG. 3 is a graph showing absorption of a standard office automation paper, inked or not, as a function of the wavelength.

In order to prevent jamming of the paper handling device, the cut system leaves areas 13 such that some parts of the cut sheet can be held fixed. The position and characteristics of these areas 13 or holding tabs are determined by the computer system, taking account of the target cut geometry and forces applied by paper handling. For example, FIG. 2A shows paper 3 comprising absorbent inking patterns 7, printed patterns 8 and indications useful for finalisation of the cut and folding 9. After the laser 2 has passed (FIG. 2B), cut lines 11, cut holes 12, and partial paper destruction lines 10 intended for folding, and tabs 13 corresponding to a partial ablation of the paper, are obtained. These tabs are located on a cut line and prevent cut parts from getting jammed in the paper feed system.

Figure 4:
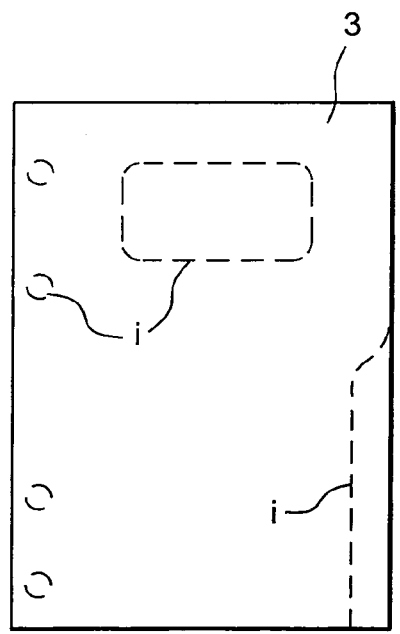
FIGS. 4 and 5 show examples of embodiments that will be possible with the device according to the invention starting from a standard paper sheet.

The peripheral device and the computer system according to the invention are used to make many paper objects starting from a standard paper sheet 3. For example, a page of a report can be obtained containing a window, perforations such that the sheet can be inserted in a folder and a tab (FIG. 4). Note that the cuts made are marked by dashed lines (i).

According to another embodiment, gluing can be done in addition to printing and cutting. In this example embodiment, the absorbent ink used is composed of a solvent and pigments absorbent at a wavelength of 1100 nm. The print head produces patterns using the same ink, with a resolution not better than 40 µm. The laser is a laser diode emitting at 1100 nm, capable of emitting one watt continuously and with an emission area of 1 µm×100 µm. The laser beam is focused using a lens so as to obtain a spot with a diameter of the order of 100 µm. This laser diode is mounted in a brass part comprising a flat base and comprising, in the center, a 250 µm diameter hole through which the laser beam exits. The focus of the laser diode is located 0 to 50 µm beyond the flat base. The laser diode is mounted on its own displacement carriage to make a displacement parallel to the paper sheet feed roller. The base of the brass part is placed in contact with the paper sheet, on the face opposite the face inked with print inks and absorbent ink. There are two advantages in attacking the cut on the side opposite inking firstly, it is thus possible to achieve contact of the brass part on the paper sheet, without risking spreading the print ink that would not be completely dry, secondly, if the absorbent ink penetrates incompletely in the paper, the laser heating and ignition action is more efficient over the entire thickness of the paper, because absorption by the laser increases as the laser radiation advances in the paper, while this radiation attenuates as it advances.

It may be advantageous if the paper feed system is distinct from the print system and is on the downstream side of the print system. Thus, the peripheral can print and ink a sheet, while a previously treated sheet is cut. Thus, it is also possible to optimise the thermo-optic environment by separating the cut stage and the inking stage.

Figure 7:
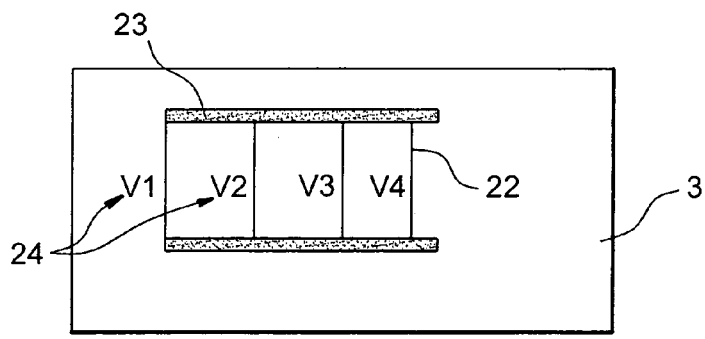
FIG. 7 shows a printed pattern on a paper support intended for the alignment procedure between the laser and the absorbent ink inking head.
Figure 8:
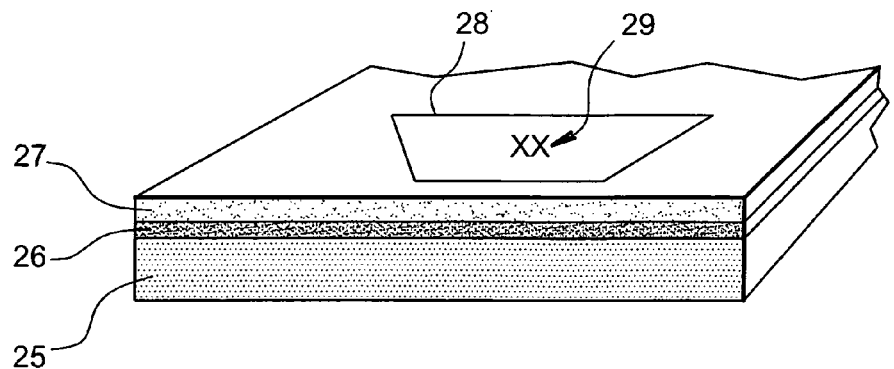
FIG. 8 is a multi-layer used during the process for making a glued structure.

It is then necessary to have an efficient alignment procedure, at least between the laser and the absorbent ink, to be able to take account of clearances that could exist between the two stages of the paper handling system, and offsets due to assembly of the cartridges or print heads. To achieve this, an inked ladder pattern could be made with absorbent ink comprising printed marks (see FIG. 7). The laser will cut the uprights 23 of the ladder, and for each bar 22 will make a different assumption about the offset between the print stage and the cut stage. The user can observe the bar that results in a complete opening, and he can then inform the system about the state of the offset.

It is possible to choose to insert adhesive or multi-layer sheets in this device comprising a silicone support (for example a silicone coated paper), an adhesive sheet that is absorbent at the wavelength of the laser and a paper film, this film being printable and absorbent in the near infrared.

Figure 5:
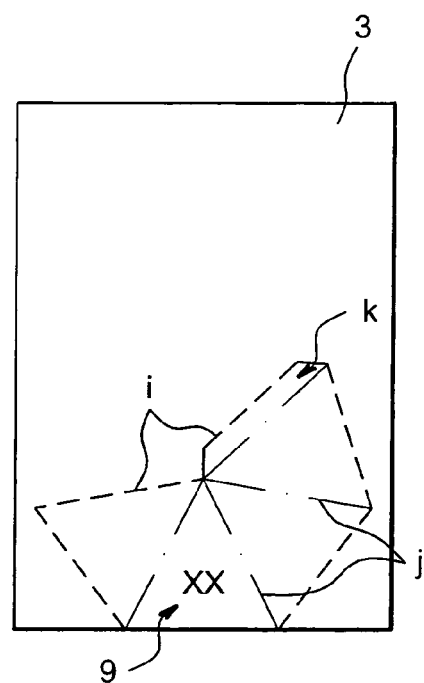
Figure 6:
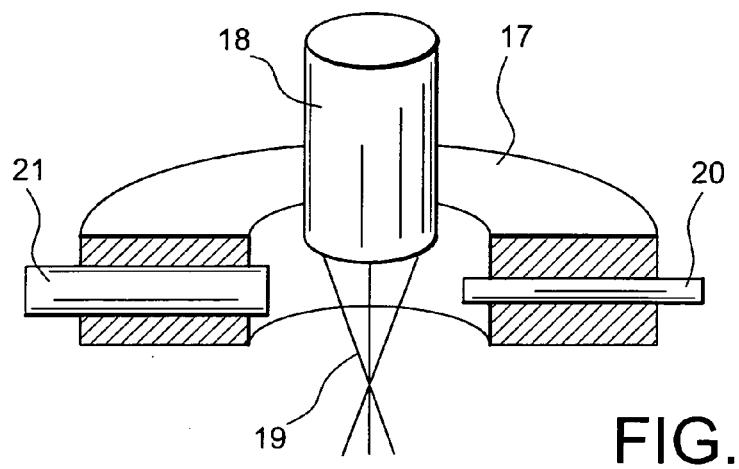
FIG. 6 shows a cutting head.

The system will be able to make cuts in the two surface layers only (adhesive sheet and printable film), using the laser and without previous inking with absorbent ink, after transferring all useful marks beforehand using printing on the upper film. The result is thus to use transferable glue films, perfectly adjusted to the required dimensions and made coherent with the objects. For example, it will be possible to make a glue tab coherent with the tab k of the paper object shown in FIG. 5, this tab being necessary to transform the folded object into a volume. The paper object shown in FIG. 5, which forms a pyramid once it has been mounted, comprises cuts i (dashes), fold marks j (chained dotted lines), printed indications 9 and a tab k that will be used for gluing.

Bibliography

[1] American U.S. Pat. No. 5,557,311, issued on 17 Sep. 1996
[2] American U.S. Pat. No. 5,760,369, issued on 2 Jun. 1998.
[3] American U.S. Pat. No. 5,556,826, issued on 17 Sep. 1996.
[4] "Laser machining, Theory and Practice", Georges Chryssolouris, Springer, 1981, p. 261.
[5] "Laser interaction with coated collagen and cellulose fibre composites: fundamentals of laser cleaning of ancient parchment manuscript and paper", by Kautek W., Pentzien S., Rudolph P., Kruge J., Konig E., Applied Surface Science, 129; 746-754, May 1998.
[6] "Multipass laser ablation of three coloured ink from a paper substrate" by Steward R., Li L. Thomas D., Journal of Materials Processing Technology 114 (2); 161-167, Jul. 20, 2001.
[7] American U.S. Pat. No. 6,117,061, issued on 12, Sep. 2000.

The invention claimed is:

1. A peripheral device comprising:
   means for printing a paper sheet;
   means for cutting the paper sheet; and
   means for receiving instructions,
   wherein the means for printing comprises a first print head, supplied by an ink cartridge to print text or drawings on the sheet of paper by ink ejection as a function of the received instructions, and a second print head, supplied by an absorbent ink cartridge capable of in depth penetration into the paper sheet, to eject ink onto locations to be cut out as a function of the received instructions, and
   wherein the means for cutting comprises a low power laser emitting a laser beam with a wavelength absorbed by locations marked with the absorbent ink as a function of the received instructions, a power of the laser being sufficient to cut the paper sheet at the inked locations and/or for partial ablation of the paper.

2. A device according to claim 1, wherein the absorbent ink comprises mineral or organic pigments and a solvent.

3. A device according to claim 1, wherein the absorbent ink is configured such that locations inked with the absorbent ink absorb at least 50% of the laser beam at its operating wavelength.

4. A device according to claim 3, wherein the absorbent ink maintains its good absorption properties at the laser wavelength up to a temperature equal to at least 200° C. and preferably up to 250° C.

5. A device according to claim 1, wherein the absorbent ink is configured such that locations inked with the absorbent ink absorb 80% or more of the laser beam at its operating wavelength.

6. A device according to claim 1, wherein the absorbent ink comprises a constituent that produces exothermal combustion when it reaches a critical temperature, the critical temperature being between 150° C. and 400° C.

7. A device according to claim 1, wherein the absorbent ink is colorless in a visible range.

8. A device according to claim 1, wherein the absorbent ink is white in a visible range.

9. A device according to claim 1, wherein the second print head ejects ink to print patterns in a form of lines, dashes, or dots not more than 500 µm wide.

10. A device according to claim 1, wherein the second print head ejects a quantity of ink equal to between 0.5 and 5 nl per mm of cut line.

11. A device according to claim 1, wherein the laser emits a laser beam with a wavelength of between 650 and 1600 nm.

12. A device according to claim 1, wherein the laser has an average light power between 0.5 and 10 watts.

13. A device according to claim 12, wherein the laser has an average light power between 1 and 4 watts.

14. A device according to claim 12, wherein the laser operates in a pulsed mode, and laser average power is at least 100 times lower than laser peak powers.

15. A device according to claim 12, wherein the laser operates in a pulsed mode, and laser average power is at least 10 times lower than laser peak powers.

16. A device according to claim 1, wherein the laser comprises one or plural semi-conducting laser diodes.

17. A device according to claim 1, wherein the laser comprises a laser beam focusing device.

18. A device according to claim 17, wherein the laser beam focusing device outputs a light spot with dimensions between 10 µm and 400 µm, on a field depth equal to at least 80 µm.

19. A device according to claim 1, wherein the means for printing and the means for cutting are located on a same lateral displacement carriage.

20. A device according to claim 1, wherein at least one face of the paper sheet close to an area illuminated by the laser is in contact with a material with a thermal diffusivity equal to at least 10 times more than a thermal diffusivity of the paper.

21. A device according to claim 20, wherein the material in contact with the paper sheet close to the area illuminated by the laser is in a form of a laser cutting head that comprises:
   a contact area in contact with the sheet and having a surface of at least 0.5 cm$^2$;
   a perforated part in the contact area enabling passage of the laser beam, and with a section equal to or greater than 1 mm$^2$ at a location at which the perforated part comes into contact with the paper; and
   a pure air inlet and a combustion fumes evacuation duct.

22. A procedure for aligning an ink cartridge with a laser beam of the device according to claim 1, comprising:
   making a first series of parallel marks on a paper sheet using the ink cartridge of the first print head, the marks being separated by a predetermined pitch;
   making a second series of parallel marks facing the first series of marks, using the ink cartridge of the second print head, an inking width of the marks in the second series being sufficient to compensate for misalignment between the absorbent ink cartridge and the laser, and being spaced by a second determined pitch different from the first pitch;
   laser cutting on the series of marks inked with the absorbent ink, using the laser;
   observing the cuts and sending information to the printer or a computer controlling the printer to identify which marks printed with ink coincide with the cuts.

23. A procedure for aligning an absorbent ink cartridge with the laser beam of the device according to claim 1, comprising:
- making a first area of parallel marks on a paper sheet using the absorbent ink cartridge of the second print head, each mark being separated by a first predetermined pitch and having a width not exceeding a width of the laser spot;
- making, by the laser beam, lines of spots in the marked first area, the lines of spots being parallel to the previous marks and being separated by a determined pitch different from the first pitch;
- observing the marks and sending information to the printer or a computer controlling the printer to identify which marks have been cut.

24. A procedure for adjusting a cutting speed of the device according to claim 1, comprising:
- making marks on a sheet using the ink cartridge of the second print head;
- passing the laser spot over the marks at different speeds;
- observing conditions under which a complete cut can be obtained.

25. A computer system comprising:
- a computer and software; and
- a peripheral device according to claim 1,
- the computer and the software being used to define patterns to be cut out coherent with the patterns to be printed that are to be made on a paper sheet, and providing instructions to the peripheral device so that the peripheral device can make the printouts and cuts.

26. A system according to claim 25, wherein the computer and the software supply instructions to the peripheral device so that the peripheral device can make interruptions in the paper cut following the target cutting pattern.

27. A system according to claim 26, determining cut paper areas to be eliminated, using an appropriate marking done with the first print head, leaving an operator free to manually detach the cut paper areas later.

28. A method for creating documents or paper objects, using the computer system according to claim 25.

29. A method for making a glued structure, comprising:
- making a document from a sheet of paper using the computer system according to claim 25, the document comprising at least one part on which glue is to be applied marked by a gluing pattern;
- feeding a multi-layer comprising, in order, a silicone coated support, an adhesive film, and a printable surface film, into the peripheral device, the adhesive film bonding to the film better than to the support, and bonding to the document made in the making a document being better than to the film, the film and the adhesive film being absorbent at an operating wavelength of the laser;
- making a gluing pattern corresponding to the gluing pattern made on the document on the multi-layer by printing the surface film using the first print head of the peripheral device;
- making a cut on the multi-layer using the laser, to delimit an area surrounding the gluing pattern in the surface film and the adhesive film, with dimensions corresponding to a part of the document on which glue is to be applied;
- separating the area from the silicone coated support;
- positioning the adhesive film side of the area on the document making the gluing patterns of the document and the surface film correspond;
- removing the surface film from the area; and
- sticking a part of the document on which the adhesive film is located, or another document.

30. A computer readable medium containing program instructions for execution on a computer system, which when executed by the computer system, cause the computer system to perform steps comprising:
- determining a printing pattern for application on printable sheets, wherein said printing pattern corresponds to a multi-page document;
- determining a target cutting pattern for at least one of said printable sheets, said target cutting pattern identifying areas on said at least one printable sheet;
- determining portions of said at least one printable sheet to be weakened, without being cut through, after a cutting operation to be performed on said at least one printable sheet according to said target cutting pattern; and
- instructing a peripheral device to perform the cutting operation without cutting through the portions of the at least one printable sheet to be weakened.

31. A computer readable medium according to claim 30, wherein said program instructions cause the computer system to perform steps further comprising:
- determining said target cutting pattern as a function of mechanical characteristics of said printable sheets.

32. A computer readable medium according to claim 30, wherein said program instructions cause the computer system to perform steps further comprising:
- determining said target cutting pattern as a function of ergonomy.

33. A computer readable medium according to claim 30, wherein said program instructions cause the computer system to perform steps further comprising:
- determining said printing pattern as a function of said target cutting pattern.

34. A computer readable medium according to claim 33, wherein said printing pattern identifies areas of said at least one printable sheet to be eliminated after a cutting operation to be performed according to said target cutting pattern.

35. A computer readable medium according to claim 30, wherein said program instructions cause the computer system to perform steps further comprising:
- retrieving information from a network; and
- determining said printing pattern and said target cutting pattern based on said information.

36. A computer readable medium according to claim 35, wherein said network is the Internet.

37. A computer readable medium according to claim 30, wherein said printing pattern comprises a three-dimensional object.

38. A computer readable medium according to claim 30, wherein said target cutting pattern defines windows for said printable sheets.

39. A computer readable medium according to claim 30, wherein said target cutting pattern defines at least one tab for said at least one printable sheet.

40. A computer readable medium according to claim 30, wherein said target cutting pattern defines perforation holes for said printable sheets.

41. A computer readable medium according to claim 30, wherein said target cutting pattern defines a folding pattern for said at least one printable sheet.

42. A computer readable medium according to claim 30, wherein said target cutting pattern defines tabs, each tab identifying a portion of said multi-page document.

43. A computer readable medium according to claim 30, wherein said target cutting pattern defines a window for a page of said document.

44. A computer readable medium according to claim 43, wherein said step of determining said target cutting pattern comprises positioning said window relative to a portion of said document.

45. A computer readable medium according to claim 44, wherein said step of determining said target cutting pattern is performed so as to show said portion through said window after a printing operation to be performed according to said printing pattern and after a cutting operation to be performed according to said target cutting pattern.

46. A computer readable medium according to claim 30, wherein said document is a financial document.

47. A computer readable medium according to claim 46, wherein said financial document is an invoice.

48. A computer readable medium according to claim 30, wherein said printing pattern represents an advertising.

49. A computer readable medium according to claim 30, wherein said printing pattern represents a game.

50. A computer readable medium containing program instructions for execution on a computer system, which when executed by the computer system, cause the computer system to perform steps comprising:
   determining a printing pattern for application on printable sheets, wherein said printing pattern corresponds to a multi-page document;
   determining a target cutting pattern for at least one of said printable sheets, said target cutting pattern identifying areas on said at least one printable sheet;
   determining locations of interruptions in said target cutting pattern so as to maintain said at least one printable sheet in a single piece even after a cutting operation to be performed on said printable sheet according to said target cutting pattern; and
   instructing a peripheral device to perform the cutting operation without cutting through the portions of the at least one printable sheet to be weakened.

51. A computer readable medium containing program instructions for execution on a computer system, which when executed by the computer system, cause the computer system to perform steps comprising:
   determining a printing pattern for application on printable sheets, wherein said printing pattern corresponds to a multi-page document;
   determining a target cutting pattern for at least one of said printable sheets, said target cutting pattern identifying areas on said at least one printable sheet;
   instructing a peripheral device, connected to said computer system, to apply a first ink on said printable sheets according to said printing pattern;
   instructing said peripheral device to apply a second ink on said areas of said at least one printable sheet according to said target cutting pattern; and
   instructing said peripheral device to direct a light onto said areas of said printable sheet where said second ink is applied.

52. A computer readable medium according to claim 51, wherein said first ink is visible.

53. A computer readable medium according to claim 52, wherein said second ink is capable of absorbing light within a range of wavelength.

54. A computer readable medium according to claim 53, wherein said light is within said range of wavelength.

* * * * *